(12) United States Patent
Krug et al.

(10) Patent No.: US 7,808,973 B2
(45) Date of Patent: Oct. 5, 2010

(54) DATA NETWORK INTERFACE AND COMMUNICATION DEVICES HAVING A DATA NETWORK INTERFACE

(75) Inventors: Wilfried Krug, Witten (DE); Gonzalo Lucioni, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 1469 days.

(21) Appl. No.: 10/437,445

(22) Filed: May 14, 2003

(65) Prior Publication Data
US 2004/0001507 A1 Jan. 1, 2004

(30) Foreign Application Priority Data
May 14, 2002 (DE) .............................. 10221425 U

(51) Int. Cl.
*H04L 12/66* (2006.01)
(52) U.S. Cl. ..................... 370/352; 370/401; 379/413
(58) Field of Classification Search ................ 370/359, 370/463, 442, 360, 337, 401, 200, 241, 352; 379/413; 713/310, 324; 455/426.1; 700/295
See application file for complete search history.

(56) References Cited

U.S. PATENT DOCUMENTS

| | | | | | |
|---|---|---|---|---|---|
| 6,101,182 | A | * | 8/2000 | Sistanizadeh et al. | 370/352 |
| 6,115,468 | A | * | 9/2000 | De Nicolo | 379/413 |
| 6,218,930 | B1 | | 4/2001 | Katzenberg et al. | |
| 6,262,993 | B1 | * | 7/2001 | Kirmse | 370/463 |
| 6,459,708 | B1 | * | 10/2002 | Cox et al. | 370/537 |
| 6,466,651 | B1 | * | 10/2002 | Dailey | 379/37 |
| 6,731,649 | B1 | * | 5/2004 | Silverman | 370/466 |
| 6,762,675 | B1 | * | 7/2004 | Cafiero et al. | 340/10.42 |
| 6,804,351 | B1 | * | 10/2004 | Karam | 379/413 |
| 6,829,231 | B1 | * | 12/2004 | Wilson | 370/352 |
| 6,898,632 | B2 | * | 5/2005 | Gordy et al. | 709/224 |
| 6,961,303 | B1 | * | 11/2005 | Binder | 370/200 |
| 7,065,354 | B2 | * | 6/2006 | Park et al. | 455/426.1 |
| 7,072,330 | B2 | * | 7/2006 | Pounds et al. | 370/352 |
| 7,085,272 | B2 | * | 8/2006 | Sugai et al. | 370/392 |
| 7,136,725 | B1 | * | 11/2006 | Paciorek et al. | 700/295 |

(Continued)

FOREIGN PATENT DOCUMENTS

EP 0 981 227 2/2000

(Continued)

OTHER PUBLICATIONS

The Evolution of Data Switching for PBX's; Bhushan, B.; Opderbeck, H.; Selected Areas in Communications, IEEE Journal on vol. 3, Issue 4, Jul. 1985 pp.569-573.*

(Continued)

*Primary Examiner*—Salman Ahmed
(74) *Attorney, Agent, or Firm*—Staas & Halsey LLP

(57) ABSTRACT

Line-oriented communication devices are coupled by a data network interface to a packet-oriented data network. The data network interface has a data network connection for coupling a data network cable to the data network, as well as a communication network connection for coupling a communication device for setting up line-oriented communication links. The data network interface couples the communication network connection and the data network connection to transmit communication signals on the communication links between the communication network connection and at least one supply conductor, which is provided for supplying voltage to data communication devices in the data network, in the data network cable.

8 Claims, 3 Drawing Sheets

U.S. PATENT DOCUMENTS

| | | | | |
|---|---|---|---|---|
| 7,200,152 | B2* | 4/2007 | Binder | 370/463 |
| 7,327,222 | B2* | 2/2008 | Peltonen | 340/310.11 |
| 7,409,566 | B1* | 8/2008 | Diab | 713/310 |
| 7,447,144 | B2* | 11/2008 | Binder | 370/200 |
| 7,454,641 | B2* | 11/2008 | Connor et al. | 713/324 |
| 7,460,523 | B2* | 12/2008 | Ree et al. | 370/352 |
| 7,505,416 | B2* | 3/2009 | Gordy et al. | 370/241 |
| 7,514,812 | B2* | 4/2009 | Krug | 307/28 |
| 7,613,837 | B2* | 11/2009 | Gordy et al. | 709/250 |
| 7,653,015 | B2* | 1/2010 | Binder | 370/293 |
| 2001/0036181 | A1* | 11/2001 | Rogers | 370/389 |
| 2002/0001302 | A1 | 1/2002 | Pickett | |
| 2002/0044545 | A1 | 4/2002 | Brumm et al. | |
| 2002/0154630 | A1* | 10/2002 | Lucioni | 370/386 |
| 2003/0212550 | A1* | 11/2003 | Ubale | 704/215 |
| 2004/0001507 | A1* | 1/2004 | Krug et al. | 370/463 |
| 2004/0258165 | A1* | 12/2004 | Peltonen | 375/257 |
| 2006/0056444 | A1* | 3/2006 | Binder | 370/463 |
| 2006/0251110 | A1* | 11/2006 | Binder | 370/463 |
| 2008/0253085 | A1* | 10/2008 | Soffer | 361/687 |

FOREIGN PATENT DOCUMENTS

| | | |
|---|---|---|
| EP | 1 100 226 | 5/2001 |
| GB | 2 276 048 | 9/1994 |
| GB | 2 356 326 A | 5/2001 |
| WO | WO 00/41496 | 7/2000 |
| WO | WO 00/67458 | 11/2000 |
| WO | WO 02/07329 A2 | 1/2002 |

OTHER PUBLICATIONS

IEEE Standard for a High-Performance Serial Bus—Amendment 2; IEEE Std 1394b-2002 (Amendment to IEEE Std 1394-1995) Publication Year: 2002.*

* cited by examiner

DATA NETWORK INTERFACE AND COMMUNICATION DEVICES HAVING A DATA NETWORK INTERFACE

CROSS REFERENCE TO RELATED APPLICATIONS

This application is based on and hereby claims priority to German Application No. 10221425.5 filed on May 14, 2002, the contents of which are hereby incorporated by reference.

BACKGROUND OF THE INVENTION

1. Field of the Invention

Most present-day communication systems are based on a line-oriented infrastructure for speech communication and on an additional data-packet-oriented infrastructure for data communication. Line-oriented communication relates in particular to conventional analog or digital speech telephony. In the course of a development activity which is taking place at the moment, efforts are being made to migrate line-oriented communication components step-by-step into a packet-oriented communication environment, for example into existing local area networks, so-called LANs.

2. Description of the Related Art

According to previous developments, for a migration process to a pure packet-oriented data network, existing line-oriented terminals must either be replaced by packet-oriented terminals or must be retrofitted with a converter, for example a so-called Internet protocol adapter, for conversion between line-oriented communication and packet-oriented communication. However, appropriate packet-oriented terminals for speech communication, or equivalent converters, are technically highly complex. Furthermore, owing to the quality required for real-time speech transmission, terminals and converters such as these are subject to considerable bandwidth and delay time requirements for the packet-oriented data network on which the data transport is based.

In contrast to this, further use of unmodified line-oriented terminals requires a separate cable network to additionally connect these terminals to the cable network for the packet data network. Such use of two separate cable networks for speech communication and data communication is likewise highly complex.

SUMMARY OF THE INVENTION

An object of the present invention is to specify less complex arrangements, by which line-oriented communication devices can be integrated in a packet-oriented data network infrastructure.

A data network interface according to the invention allows line-oriented communication devices, such as digital or analog terminal or switching devices for any of speech, video and fax real-time communication, to be coupled with little complexity via a packet-oriented data network, such as one or more of a local area network (LAN), a wide area network (WAN) and a system area network (SAN).

The data network interface has a data network connection for coupling a data network cable for the data network, as well as a communication network connection for coupling a communication device for setting up line-oriented communication links.

According to the invention, the data network interface also provides coupling between the communication network connection and the data network connection, for transmitting communication signals, for example analog telephony signals or digital time division multiplex (TDM) signals on the communication links between the communication network connection and at least one supply conductor, which is provided for supplying voltage to data communication devices in the data network, in the data network cable.

This allows both line-oriented communication devices, such as TDM terminals, as well as packet-oriented communication devices, such as so-called VoIP terminals, where VoIP stands for Voice over Internet Protocol, to be used simply in a common wiring infrastructure. Existing data network wiring, for example LAN wiring, can be used as a common wiring infrastructure. There is therefore no need to provide any separate cable networks for line-oriented communication devices on the one hand, or for packet-oriented communication devices on the other hand. Wiring networks such as these are highly complex, particularly for providing the wiring for terminal devices, since there are generally a large number of them. The invention has therefore been found to be particularly advantageous owing to the possibility of avoiding multiple wiring, in particular for the wiring for terminal devices.

A further advantage of the invention is that no additional quality of service requirements need be placed on the packet-oriented data network to comply with any real-time requirements for the line-oriented communication links.

According to one advantageous embodiment of the invention, the coupling between the communication network connection and the data network connection can be provided by superimposing the communication signals on a supply voltage which is applied to the at least one supply conductor, and/or for extracting communication signals from a supply voltage on which they have been superimposed in this way.

Furthermore, the coupling can be provided by feeding a supply voltage, which originates from a communication device and is coupled to the communication network connection, to the at least one supply conductor. This makes it possible, for example, to use a TDM voltage supply, which originates from a private branch exchange, for supplying voltage to data communication devices in the data network. This makes it possible to replace a voltage supply provided specifically for the data network.

According to a further advantageous embodiment of the invention, at least two supply conductors and a so-called phantom feed circuit can be provided for supplying voltage to these supply conductors. A phantom supply circuit allows voltages to be supplied on conductors that are carrying data. The phantom supply circuit also allows the communication signals to be transmitted without any adverse effect on data packet traffic via conductors that are carrying data. For this purpose, the communication signals may be superimposed on a supply voltage.

The communication network connection for the data network interface according to the invention can preferably be provided by a TDM connection for coupling TDM-based communication devices.

The data network interface according to the invention can be integrated in a data packet switching device, for example a so-called switch, a so-called hub, a router device or a link. In this case, two or more data network connections for one or more data network interfaces can be coupled to one another for packet-oriented data traffic, and can be isolated from one another for the communication signals. In this way, two or more line-oriented communication links can be logically and physically isolated from one another by the data packet switching device. Furthermore, two or more data network connections or one or more data network interfaces of the data packet switching device can be coupled in a transparent manner for the communication signals. This allows bus-like wiring of line-oriented communication devices.

A data network interface according to the invention can also be integrated in a respective line-oriented communication device, to allow this to be coupled directly to a packet-oriented data network.

Furthermore, a packet-oriented data network can easily have a data network interface according to the invention, and which is coupled to it, added to it to form a communication system for both line-oriented and packet-oriented communication. For this purpose, a line-oriented switching device can be connected to the communication network connection of the data network interface, and at least one further line-oriented communication device can be connected via the data network to the data network connection of the data network interface, so that the further communication device is coupled to the switching device for the communication signals.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
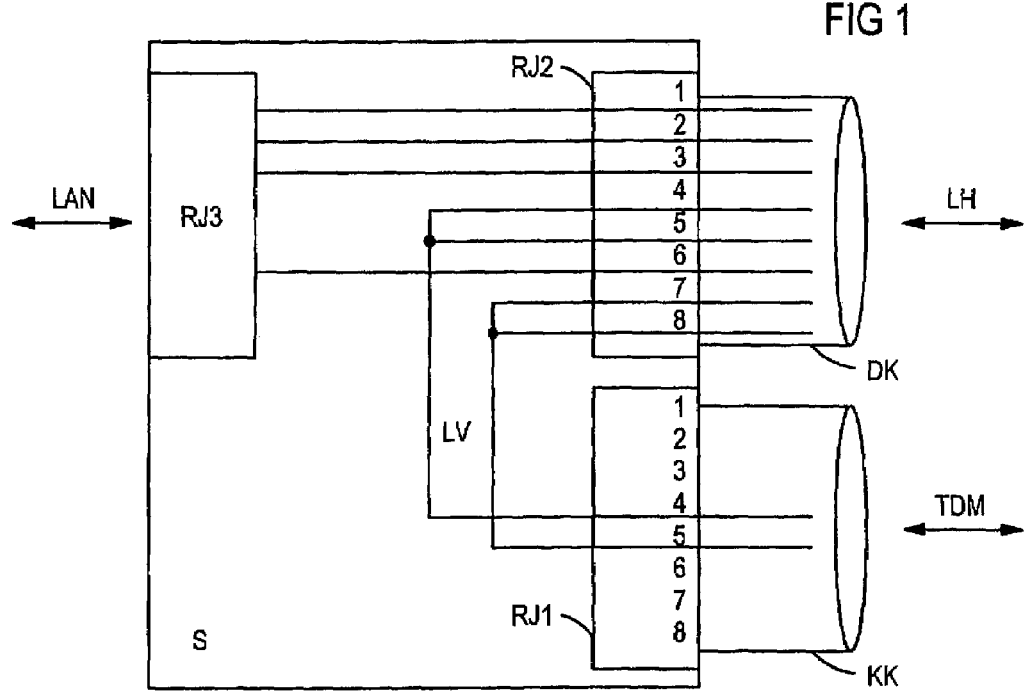
FIGS. 1 and 2 each show one exemplary embodiment of a data network interface according to the invention, and FIGS. 3 and 4 each show a communication system having two or more line-oriented and packet-oriented communication devices which are coupled to one another via a packet-oriented data network.

Reference will now be made in detail to the preferred embodiments of the present invention, examples of which are illustrated in the accompanying drawings, wherein like reference numerals refer to like elements throughout.

Figure 2:
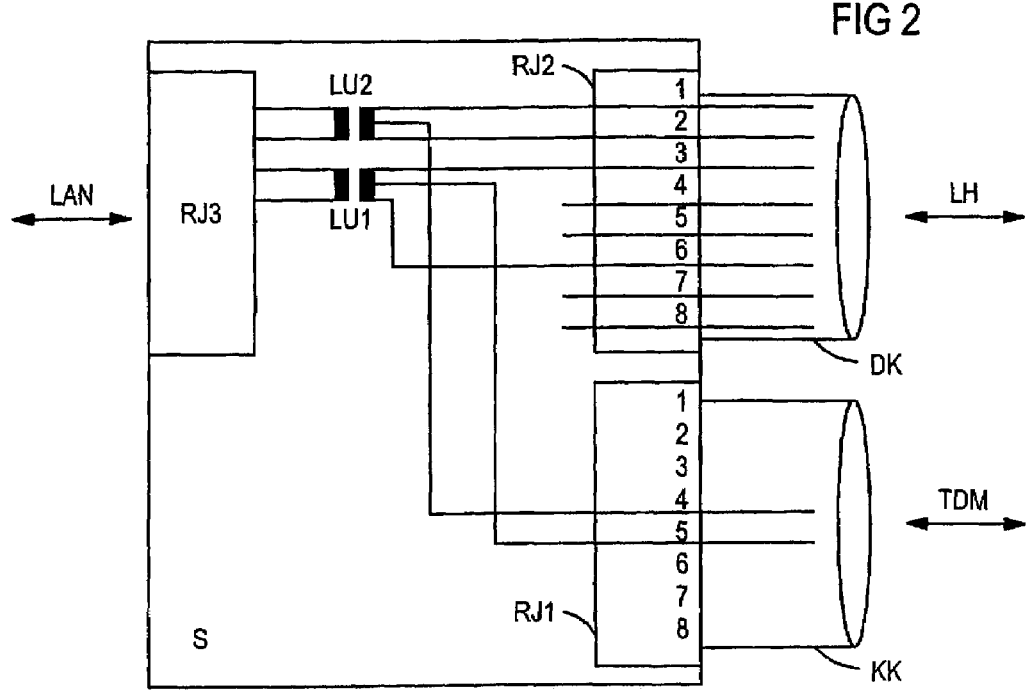

FIGS. 1 and 2 each show one exemplary embodiment of a data network interface S according to the invention, illustrated schematically. The data network interfaces S each have a data network connection RJ3 for connection of a packet-oriented data network LAN, in this case a data network LAN based on the Internet protocol, a data network connection RJ2 for connection of a packet-oriented data network LH, in this case a data network LH which is based on the Internet protocol, as well as a communication network connection RJ1 for connection of a line-oriented communication device, in this case a TDM-based communication device, for example for speech, video and/or fax real-time communication. In this case, a data network cable DK is used for connection of the data network LH, and a communication network cable KK is used for connection of the communication device. The communication network cable KK may, for example, be a two-wire cable for a UPOE interface.

The connections RJ1, RJ2 and RJ3 are preferably in the form of so-called RJ45 connecting sockets. The connecting contacts of the connections RJ1 and RJ2 are numbered using the numbers 1, . . . , 8 in accordance with the RJ45 connector system standard. A ground connection, to which all the voltages can be related, is not shown, for clarity reasons.

The data network LH in the present exemplary embodiments is in the form of a local area network based on the Internet protocol, with a so-called LAN supply in accordance with IEEE Standard 802.3af for supplying voltage to data network terminals that are based on the Internet protocol.

The communication network connection RJ1 is used for connecting a respective TDM-based communication device to a so-called TDM supply, in which a supply voltage for connecting TDM terminals is transmitted via the communication network cable KK. The TDM supply voltage has TDM communication signals superimposed on it, which are to be transmitted for line-oriented communication connections, on the communication network cable KK. In the present exemplary embodiments, the TDM supply voltage and the super-imposed TDM communication signals can be fed into the connecting contacts 4 and 5 of the communication network connection RJ1. The supply voltage for the TDM supply, as well as the TDM communication signals, are fed from the communication connection RJ1 to the data network connection RJ2, and from it, into supply conductors in the data network cable DK, which are provided for the LAN supply. This makes it possible to use an existing TDM supply, for a TDM-based communication device which is coupled to the data network interface S, for the LAN supply.

In the exemplary embodiment of the data network interface S illustrated in FIG. 1, the LAN supply is provided via separate supply conductors 4, 5, 7, and 8 in the data cable DK, that is to say supply conductors which do not carry data. The cable conductors in the data cable DK and in the communication network cable KK are numbered here and in the following text in the same way using the numbers 1, . . . , 8 as the respective corresponding connecting contacts of the connections RJ1 and RJ2. To transmit the supply voltage, which is fed into the connecting contacts 4 and 5 of the communication connection RJ1, and TDM communication signals to the separate supply conductors 4, 5, 7 and 8 in the data cable DK, a conductive connection LV is provided for coupling between the connecting contact 4 of the communication network connection RJ1 and the connections 4 and 5 of the data network connection RJ2 on the one hand, and between the connection 5 of the communication network connection RJ1 and the connections 7 and 8 of the data network connection RJ2 on the other hand.

In the exemplary embodiment of a data network interface S according to the invention as illustrated in FIG. 2, the LAN supply is provided via data-carrying cable conductors 1, 2, 3 and 6 in the data network cable DK. This means that the data-carrying cable conductors 1, 2, 3 and 6 are at the same time used as supply conductors for the LAN supply. In FIG. 2, so-called LAN transformers LU1 and LU2 are provided for transmitting the supply voltage, which is fed into the cable conductors 4 and 5 of the communication network connection RJ1, and TDM communication signals to the data-carrying cable conductors 1, 2, 3 and 6 in the data cable DK. The LAN transformers LU1 and LU2 each include a transformer whose first winding is connected to the data network connection RJ3 and whose second winding is connected to data-carrying connecting contacts of the data network connection RJ2. The coil ends of the second winding of the LAN transformer LU1 are in this case connected to the connecting contacts 3 and 6 of the data network connection RJ2, and the coil ends of the second winding of the LAN transformer LU2 are connected to the connecting contacts 1 and 2 of the data network connection RJ2. The second windings of the LAN transformers LU1 and LU2 each have a center tap, which in the case of the LAN transformer LU1 is connected to the connecting contact 5, and in the case of the LAN transformer LU2 is connected to the connecting contact 4 of the communication network connection RJ1. The LAN transformers LU1 and LU2, which are provided with a center tap, each provide a phantom supply circuit for supplying the data-carrying cable conductors 1, 2, 3 and 6 in the data cable DK by the TDM supply voltage which is fed in via the connecting contacts 4 and 5 of the communication network connection RJ1 and which has TDM communication signals superimposed on it. The phantom supply circuit feeds the TDM supply voltage and the TDM communication signals which are superimposed on it in phase into the conductor pair 1, 2 and into the conductor pair 3, 6 of the data network cable DK, respectively. In contrast, the data signals on which the packet-oriented data traffic is based are fed in through the LAN transformers LU1 and LU2 in antiphase into the conductor pair 1, 2 and into the conductor pair 3, 6 of the data network cable DK, respectively. In this way, the supply voltage which is fed in via the communication network cable KK and the TDM communication signals are reversibly superimposed on the data signals in the data network LH. Terminals which are connected to the data network LH via a corresponding data network interface with a corresponding transformation circuit can separate the data signals from the TDM communication signals and from the supply voltage, once again. A data network interface which is used for this purpose is frequently referred to as a splitter.

The embodiment of the data network interface S according to the invention as illustrated in FIG. 2 and having a phantom supply to the LAN transformers LU1 and LU2 may be used in particular in so-called 1000Base-T-LANs, in which a LAN supply is provided on the data-carrying conductors.

Figure 3:
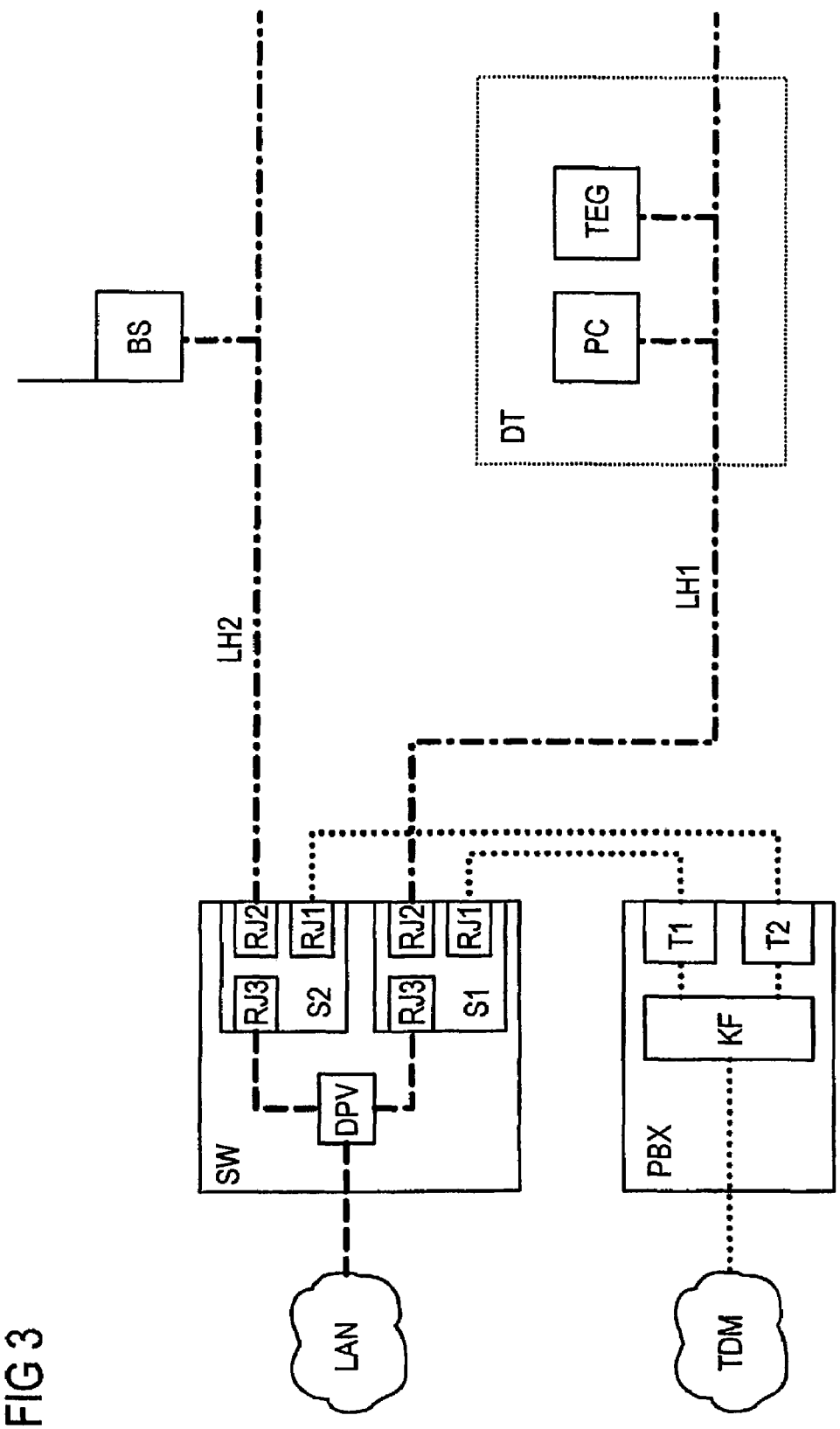

FIG. 3 shows, schematically, a communication system having two or more line-oriented and packet-oriented communication devices, which are coupled to one another via a packet-oriented data network. The communication system includes a TDM-based switching device PBX, for example a private branch exchange, which is coupled to a data packet switching device SW, for example a switch, HUB, router or a link. The switching device PBX has a TDM switching matrix KF, to which a TDM-based communication network TDM as well as two or more digital TDM subscriber interfaces T1, T2 are connected, with a TDM supply, for example so-called UPOE interfaces. The subscriber interfaces T1 and T2 each provide a supply voltage on which the TDM communication signals are superimposed.

The data packet switching device SW includes a data packet switching module DPV, to which a conventional local area network LAN or LAN supply is connected. The data packet switching device SW also has two or more data interfaces S1, S2 according to the invention, as shown in FIG. 1 or FIG. 2. The data interfaces S1 and S2 are each coupled via their communication network connection RJ3 to the data packet switching module DPV. The data network interface S1 is also coupled via its communication network connection RJ1 to the subscriber interface T1 of the switching device PBX, and via its data network connection RJ2 to a data network branch LH1 with the LAN feed. The data network interface S2 is connected in a corresponding manner by its communication connection RJ1 to the subscriber interface T2, and via its data network connection RJ2 to a data network branch LH2 with an LAN supply. The data network branches LH1 and LH2 receive their LAN supply voltage via the data network interfaces S1 and S2 from the TDM supply for the switching device PBX. The TDM communication signals are in each case superimposed on the supply voltages which are applied to the data network branches LH1 and LH2.

The different categories of the respectively transported communication signals are indicated by different line types in FIG. 3. The purely TDM-based signal lines are thus represented by dotted lines, the purely packet-oriented signal lines by dashed lines, and the lines which carry both TDM communication signals and data packets are represented by dashed-dotted lines.

For TDM communication signals, the data network branch LH1 is coupled via the data network interface S1 to the subscriber interface T1, and the data network branch LH2 is coupled via the data network interface S2 to the subscriber interface T2. The data network interfaces S1 and S2 are in this case isolated from one another for the communication signals, so that the connections via T1, S1 and LH1 as well as via T2, S2 and LH2 form separate TDM communication branches.

For reasons of clarity, FIG. 3 shows only two such TDM communication branches to allow existing switching devices, which typically have 16 TDM subscriber interfaces, to be used in an advantageous manner, 16 data network interfaces must be provided in a corresponding manner for star connection of 16 data network branches with an LAN supply.

The data network branch LH1 in the present exemplary embodiment leads to a typical work station DT, which is equipped with a personal computer PC and with a TDM-based telephone TEG. The personal computer PC and the telephone TEG are in this case each connected via a data network interface (not shown) to the data network branch LH1. The data network interface of the telephone TEG is in this case used for extraction of the supply voltage and of the TDM communication signals from the supply conductors of the data network branch LH1. In this way, the telephone TEG is coupled via the data network interface S1 to the subscriber interface T1 of the switching device PBX for the TDM communication signals. In contrast, the data network interface of the personal computer PC is used for interchanging data packets with the data network branch LH1. The personal computer PC is coupled via the data packet switching device SW to the data network branch LH2 and to the local area network LAN.

Furthermore, in the present exemplary embodiment, a base station BS is connected to the data network branch LH2 for wire-free coupling of packet-oriented communication terminals, for example for the purpose of a so-called wireless LAN or for wire-free coupling of line-oriented communication terminals, for example cordless telephones. For line-oriented communication, the base station BS is coupled via the data network interface S2 to the subscriber interface T2 of the switching device PBX. For data packet communication, the base station BS can be coupled via the data packet switching device SW to the local area network LAN as well as to the data network branch LH1 and thus to the personal computer PC.

Figure 4:
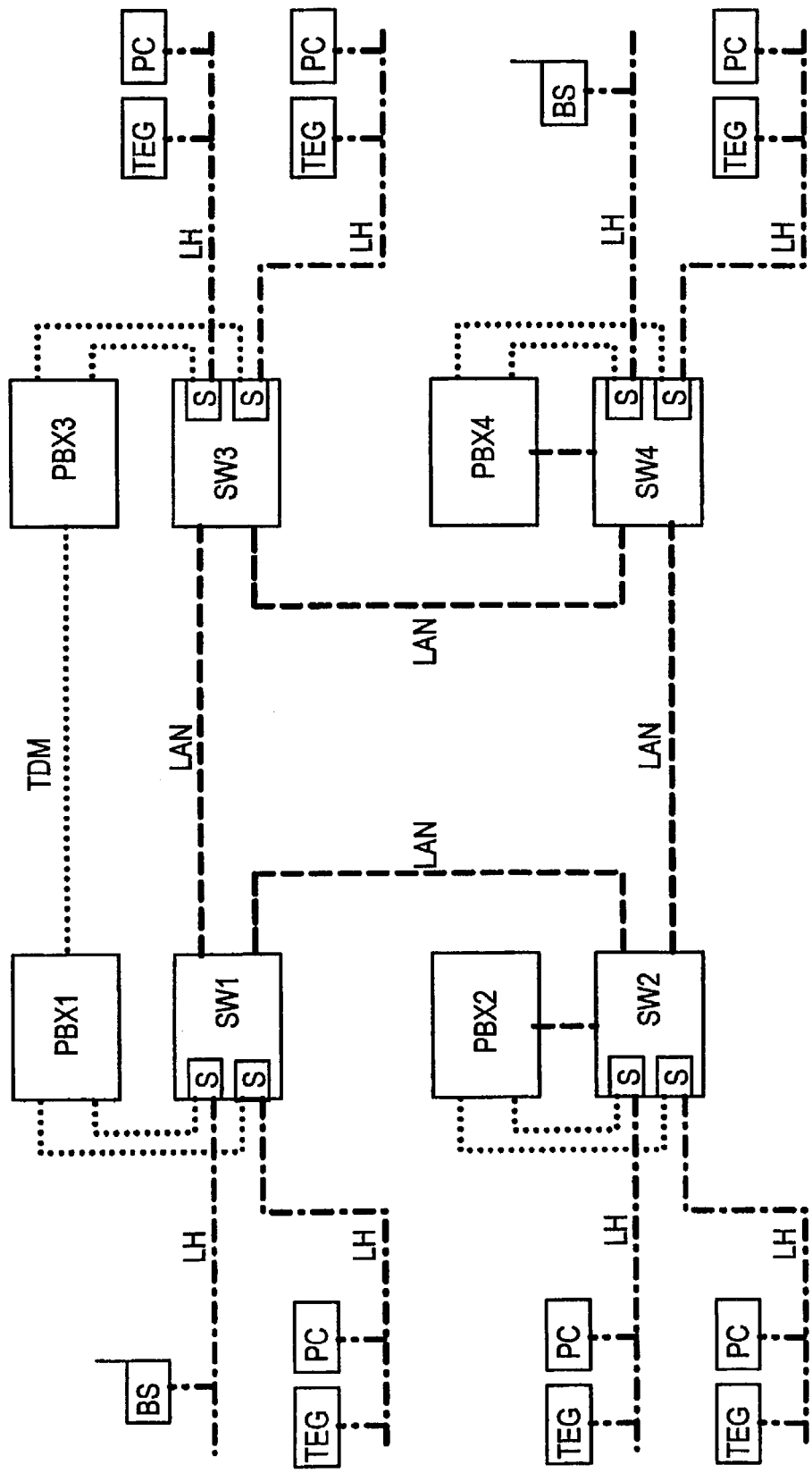

Finally, FIG. 4 shows a communication system which includes two or more arrangements as shown in FIG. 3 which are coupled to one another illustrated schematically. In this case, two or more data packet switching devices SW1, SW2, SW3 and SW4 which are each provided with two data network interfaces S according to the invention, are coupled to one another via local area networks LAN. In this case, both a local area network LH with an LAN supply and a TDM communication channel which is superimposed on the supply voltage as well as a respective TDM subscriber interface of a respective switching device PBX1, PBX2, PBX3 or PBX4 are coupled to a respective data network interface S. Both line-oriented communication devices, in this case TDM-based telephones TEG and possibly line-oriented base stations BS, as well as packet-oriented communication devices, in this case personal computers PC and possibly packet-oriented base stations BS, are coupled to the data network branches LH. While the switching devices PBX1 and PBX3 are coupled to one another via a TDM path TDM, the switching devices PBX2 and PBX4 are connected via additional LAN gateways to the switching devices SW2 and SW4, and can thus be connected to one another via their LAN link.

The packet-oriented communication devices PC, and possibly BS, which are connected to the data network branches LH can be coupled to one another via the data packet switching devices SW1, SW2, SW3 and SW4 and the local area network LAN. Furthermore, the line-oriented communication devices TEG, and possibly BS, are connected to the line-oriented switching devices PBX1, PBX2, PBX3 and PBX4, via the data network interfaces S, for the TDM communication signals that are to be transmitted.

The different categories of the respectively transported communication signals are indicated in FIG. 4 in the same way as in FIG. 3 by different types of line.

The data network interfaces S according to the invention allow communication channels which are based on the Internet protocol and TDM-based communication channels to be combined in a common wiring infrastructure, namely the data network branches LH. Existing LAN wiring can preferably be used for the data network branches LH, whose physical channel, which is provided for an LAN supply, is used for transmitting an additional line-oriented communication channel, in this case a TDM-based communication channel. This additional line-oriented communication channel is superimposed in a simple manner on a respective supply voltage. The advantageous real-time characteristics of a line-oriented communication channel in this case remain unaffected. Furthermore, existing packet-oriented and line-oriented communication devices can still be used, largely unmodified, via a common physical interface, by data network interfaces according to the invention.

The invention has been described in detail with particular reference to preferred embodiments thereof and examples, but it will be understood that variations and modifications can be effected within the spirit and scope of the invention.

What is claimed is:

1. A data network interface for coupling line-oriented communication devices via a packet-oriented data network to a line-oriented communication network, the packet-oriented data network having at least one data network cable with at least one supply conductor provided for supplying voltage to data communication devices in the data network, comprising:
    a data network connection for the at least one data network cable of the packet-oriented data network;
    a communication network connection for at least one communication signal line of said line-oriented communication network; and
    coupling means, arranged between said communication network connection and said data network connection, for transmitting communication signals between said communication network connection and the at least one supply conductor in the at least one data network cable, wherein
    the communication signals transmitted between the communication network connection and the at least one supply conductor in the at least one data network cable are line-oriented communication signals fed into the at least one supply conductor, and
    said coupling means includes feed means for feeding a supply voltage, which originates from the line-oriented communication network that is coupled to said communication network connection, to the at least one supply conductor.

2. The data network interface as claimed in claim 1, wherein said coupling means includes superimposition means for superimposing the communication signals on a supply voltage which is applied to the at least one supply conductor.

3. The data network interface as claimed in claim 1, wherein the at least one data network cable includes two supply conductors provided for supplying voltage to data communication devices in the data network, and
    wherein said coupling means provides a phantom supply circuit for supplying voltage to the at least two supply conductors.

4. The data network interface as claimed in claim 3, wherein said communication network connection is a time division multiplexing (TDM) connection for coupling TDM-based communication devices.

5. A data packet switching device having at least one data network interface for coupling line-oriented communication devices via a packet-oriented data network to a line-oriented communication network, the packet-oriented data network having at least one data network cable with at least one supply conductor provided for supplying voltage to data communication devices in the data network, comprising:
    at least two data network connections, each for a corresponding data network cable of the packet-oriented data network, coupled to one another for packet-oriented data traffic and isolated from one another for communication signals;
    a communication network connection for at least one communication signal line of said line-oriented communication network; and
    coupling means, arranged between said communication network connection and said at least two data network connections, for transmitting communication signals between said communication network connection and the at least one supply conductor in the corresponding data network cable, wherein
    the communication signals transmitted between the communication network connection and the at least one supply conductor are line-oriented communication signals fed into the at least one supply conductor, and
    said coupling means includes feed means for feeding a supply voltage, which originates from the line-oriented communication network that is coupled to said communication network connection, to the at least one supply conductor.

6. A data packet switching device having at least one data network interface for coupling line-oriented communication devices via a packet-oriented data network to a line-oriented communication network, the packet-oriented data network having at least one data network cable with at least one supply conductor provided for supplying voltage to data communication devices in the data network, comprising:
    at least two data network connections, each for a corresponding data network cable of the packet-oriented data network, coupled in a transparent manner for communication signals;
    a communication network connection for at least one communication signal line of said line-oriented communication network; and
    coupling means, arranged between said communication network connection and said at least two data network connections, for transmitting communication signals between said communication network connection and the at least one supply conductor in the corresponding data network cable, wherein
    the communication signals transmitted between the communication network connection and the at least one supply conductor are line-oriented communication signals fed into the at least one supply conductor, and said coupling means includes feed means for feeding a supply voltage, which originates from the line-oriented communication network that is coupled to said communication network connection, to the at least one supply conductor.

7. A communication device for setting up line-oriented communication links to a line-oriented communication network that is connectable to a packet-oriented data network having at least one data network cable with at least one supply conductor provided for supplying voltage to data communication devices in the data network, comprising:

a data network connection for the at least one data network cable of the packet-oriented data network;

a communication network connection for at least one communication signal line of said line-oriented communication network; and coupling means, arranged between said communication network connection and said data network connection, for transmitting communication signals between said communication network connection and the at least one supply conductor in the at least one data network cable, wherein the communication signals transmitted between the communication network connection and the at least one supply conductor are line-oriented communication signals fed into the at least one supply conductor, and said coupling means includes feed means for feeding a supply voltage, which originates from the line-oriented communication network that is coupled to said communication network connection, to the at least one supply conductor.

8. A communication system, comprising:

a packet-oriented data network including data communication devices and at least one data network cable with at least one supply conductor provided for supplying voltage to the data communication devices in the data network;

a line-oriented switching device;

a data network interface for setting up line-oriented communication links, including a data network connection for the at least one data network cable of said packet-oriented data network;

a communication network connection connected to said line-oriented switching device;

coupling means, arranged between said communication network connection and said data network connection, for transmitting communication signals on the line-oriented communication links between said communication network connection and the at least one supply conductor in the at least one data network cable; and at least one line-oriented communication device connected via said packet-oriented data network to said data network connection of said data network interface, and thereby coupled to said line-oriented switching device for the communication signals, wherein the communication signals transmitted between the communication network connection and the at least one supply conductor in the at least one data network cable are line-oriented communication signals fed into the at least one supply conductor, and said coupling means includes feed means for feeding a supply voltage, which originates from the line-oriented communication network that is coupled to said communication network connection, to the at least one supply conductor.

* * * * *